Oct. 15, 1929.    J. E. WRIGHT    1,731,558
STEERING APPARATUS
Filed Nov. 20, 1926    2 Sheets-Sheet 1
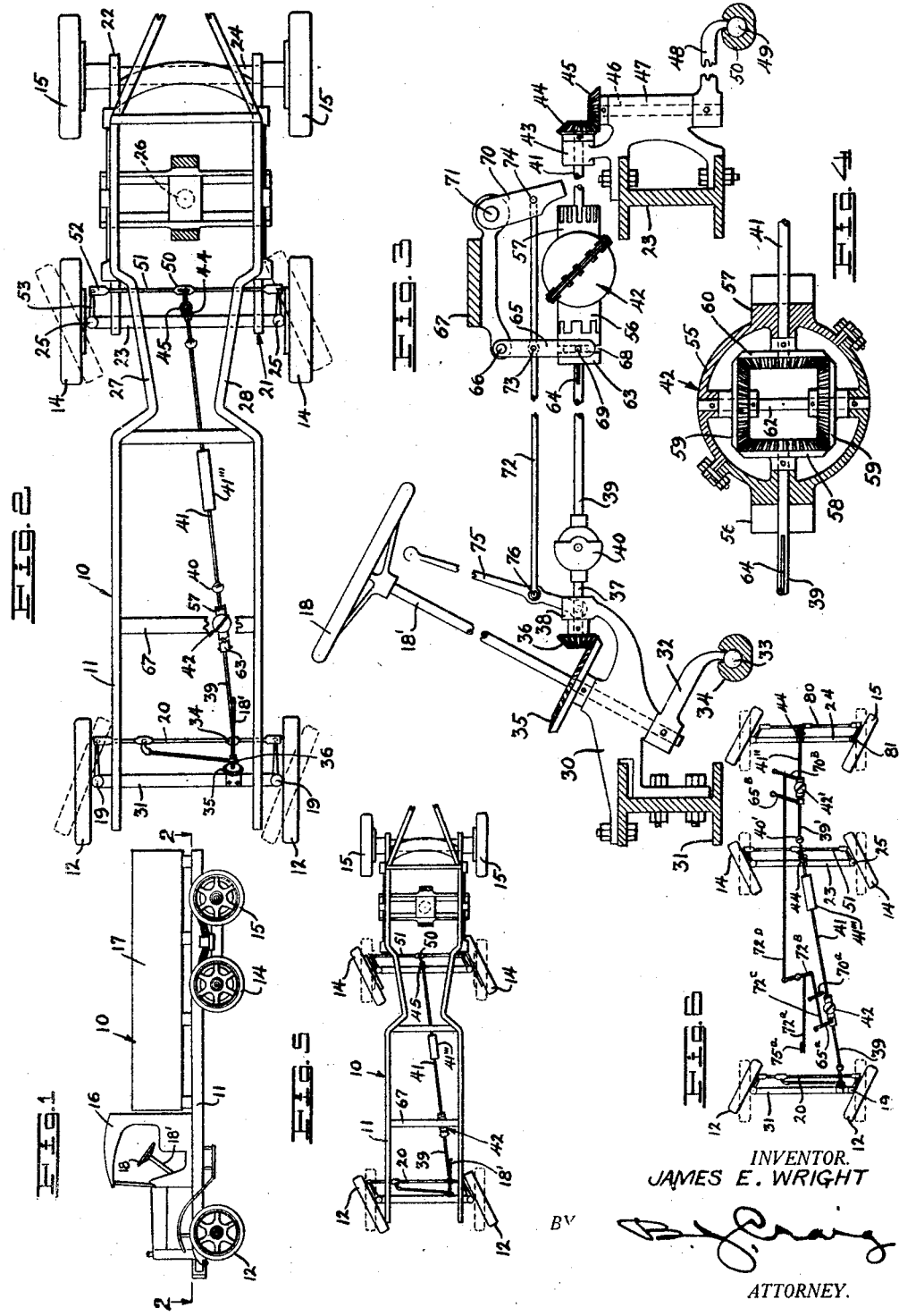
INVENTOR.
JAMES E. WRIGHT
BY
ATTORNEY.

Oct. 15, 1929. J. E. WRIGHT 1,731,558
STEERING APPARATUS
Filed Nov. 20, 1926 2 Sheets-Sheet 2
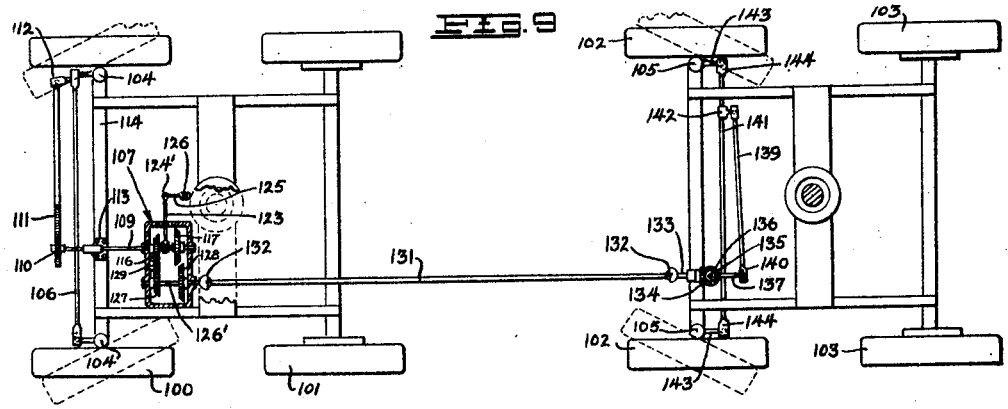
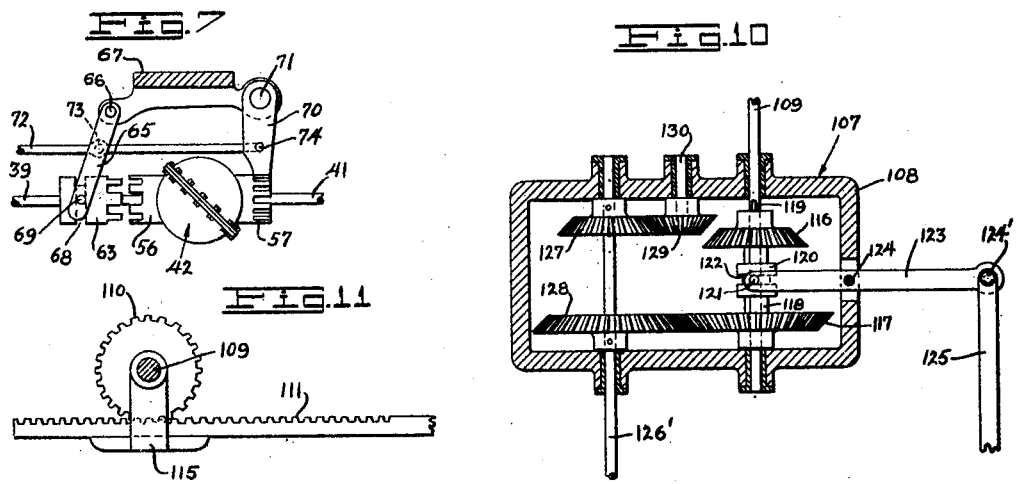
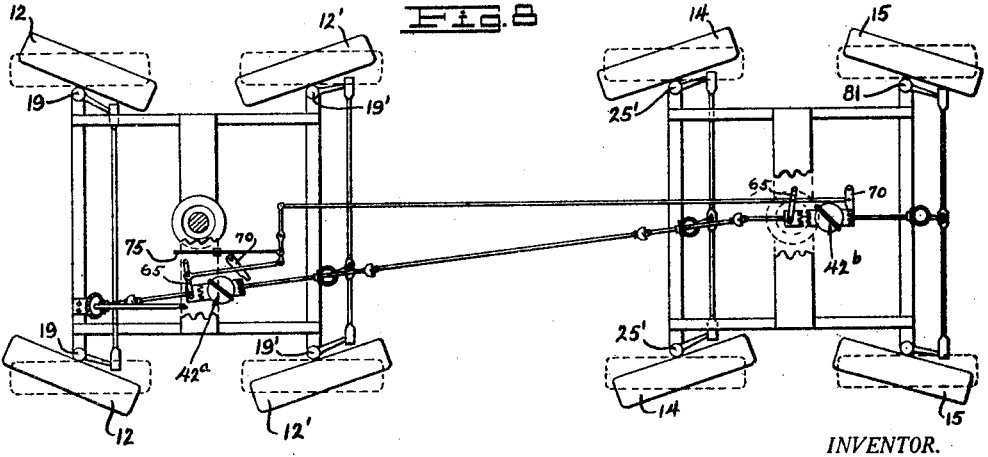
INVENTOR.
JAMES E. WRIGHT
BY
ATTORNEY.

Patented Oct. 15, 1929

1,731,558

UNITED STATES PATENT OFFICE

JAMES E. WRIGHT, OF LOS ANGELES, CALIFORNIA

STEERING APPARATUS

Application filed November 20, 1926. Serial No. 149,574.

This invention relates to highway vehicles.

The general object of the invention is to provide a highway vehicle wherein a plurality of supporting wheels are provided at each side of one end of the vehicle, and wherein improved means is provided for steering said wheels.

Another object of the invention is to provide a vehicle with four or more rear wheels mounted so that all of the wheels may swing for steering purposes.

Another object of my invention is to provide a vehicle with a plurality of rear wheels adapted to be steered and a plurality of front wheels which are mounted to swing for steering purposes.

An additional object of the invention is to provide a vehicle wherein the vehicle is provided with tandem rear wheels arranged on a frame and wherein the entire frame may swivel, and wherein means is provided for turning certain of said wheels independent of the swiveling action of the frame.

A further object of the invention is to provide novel means for steering the wheels of a highway vehicle.

Still another object of the invention is to provide a novel steering means for the front and rear wheels of a vehicle, including reversible means whereby the front and rear wheels may be swung at opposed angles to one another, or may be swung at the same angle.

Other objects of the invention will be apparent from the following description, taken in connection with the accompanying drawings wherein:

Fig. 1 is a side elevation of a truck embodying the features of my invention.

Fig. 2 is a sectional view taken on line 2—2 of Fig. 1 showing the main chassis frame and steering mechanism.

Fig. 3 is an enlarged side elevation partly in section showing the steering mechanism.

Fig. 4 is an enlarged vertical section of a reversible transmission such as may be used in conjunction with my steering apparatus.

Fig. 5 is a view similar to Fig. 2 showing the front and rear steering wheels turned in the same direction.

Fig. 6 is a diagrammatic view showing my invention employed for steering two front wheels and four rear wheels simultaneously.

Fig. 7 is a side elevation of the reversible steering transmission showing the same in a reversed position.

Fig. 8 is a top plan view of the front and rear trucks of an eight wheeled vehicle illustrating means for steering all of said wheels.

Fig. 9 is a view similar to Fig. 2 showing a modified form of steering means.

Fig. 10 is an enlarged detail section showing a reversible transmission which may be used in conjunction with the modified form of steering mechanism, and Fig. 11 is a front view of a rack and pinion which may be used to operate the modified form of reversible transmission.

Referring to the drawings by reference characters I have indicated a motor vehicle embodying the features of my invention generally at 10. This vehicle comprises a chassis including a frame 11 having a pair of front wheels 12 thereon and having two pairs of rear wheels 14 and 15. The motor vehicle shown is of the truck type and is provided with a cab 16, a body 17, which may be of any desired character, and a steering wheel 18. Although I herein describe my invention in conjunction with a self propelled vehicle, it will be understood that the invention is not restricted to that use.

In the embodiment of my invention as shown in Fig. 1, the front wheels 12 are mounted to turn about vertical axes 19. These wheels are adapted to be shifted by means of a rod 20 in the usual manner.

Two pairs of rear wheels 14 and 15 are mounted on a truck or frame indicated generally at 21. This truck or frame comprises longitudinally extending side members 22 and transverse members or axles 23 and 24. The wheels 15 are shown as mounted for rotary movement about the axis of the transverse member 24, but do not shift their axis relative to the axis of the member 24. The wheels 14 of the truck are mounted to rotate about the axis of the transverse member 23 and to shift about vertical axes 25 when the truck or frame 21 is turned.

In order that an effective turn may be made while driving the vehicle, I provide a swivel joint 26 on which the small truck 11 is supported. The chassis of the truck is bent inwardly as at 27 and 28 to accommodate the wheels 14 and 15 when the truck 21 is turned relative to the frame 11.

The steering mechanism comprises the usual steering shaft 18' mounted in a bracket 30, mounted on an axle 31. The steering wheel 18 is secured at the upper end of the shaft 18' and an arm 32 is secured to the lower end. The arm 32 is provided at one end with a ball 33 for engagement with a socket 34 on the usual steering rod 20.

Mounted on the shaft 18', intermediate its length, I show a bevel gear 35 in mesh with a gear 36 secured to a shaft 37. The shaft 37 is mounted to rotate in a bracket 38 integral with the bracket 30.

The shaft 37 is connected to a shaft 39 by a universal joint 40. This shaft 39 is connected to a shaft 41 through the medium of a reversing mechanism 42. The shaft 41 is mounted to rotate in a bearing 43 and has a bevel gear 44 secured upon its end. The bevel gear 44 meshes with another bevel gear 45 secured on a shaft 46 mounted in a bearing 47. The bearing 47 is secured to the axle 23 in any suitable manner. The shaft 41 also includes a universal joint 41' and a slip joint 41''', as shown in Fig. 2.

At the lower end of the shaft 46 an arm 48 is secured. This arm has a ball 49 which is in engagement with a socket 50 mounted on a rod 51 which extends transversely of the truck and is provided at its outer ends with sockets 52 engaging arms 53 of the steering knuckle 25 of the wheels 14.

The reversing transmission 42 as shown comprises a bulbous body portion 55 and clutch members 56 and 57. Mounted within the body portion 55 and secured to the shaft 39 a bevel gear 58 is shown in mesh with opposed bevel gears 59 which in turn mesh with a bevel gear 60 secured to the shaft 41. The bevel gears 59 are mounted on a shaft 62 mounted in the body 55.

Mounted on the shaft 39 a clutch member 63 is shown which may be placed in engagement with the clutch member 56 on the body 55. Rotation is imparted to the clutch portion 63 by the shaft 39 through the medium of a key 64.

For operating the clutch portion 63 I show an arm 65 pivoted as at 66 to a transverse member 67 on the frame 11. Adjacent the lower end of arm 65 is a slot 68 engaging a pin 69 on the clutch member 63.

For operating the clutch portion 57 an arm 70 is provided. This arm is pivoted to the transverse member 67 at 71. To operate the clutch operating arms 65 and 70 a rod 72 is provided which is pivotally secured to the arm 65 at 73 and to the arm 70 at 74, and at its forward end is pivotally engaged to a hand lever 75 at 76. The hand lever is pivotally secured to the bracket 30.

From the foregoing description it will be apparent that when the steering wheel 18 is turned to the right the front wheels 12 of the vehicle will be turned to the dotted line position shown in Fig. 2, and if the clutch member 63 is in engagement with the clutch member 56 as shown in Fig. 3 the rotation of the shaft 18' will, by means of the gear 35 and pinion 36, cause the shaft 37 to drive the shaft 39 and the clutch member 63. This member 63 will rotate the housing 55 and as the shaft 39, clutch 63 and the gear 58 on the end of the shaft 39 are all rotating uniformly in the same direction, the gears 59 will cause the gear 60 to rotate, which in turn will rotate the shaft 41 in the same direction as the shaft 39. The shaft 41 will rotate the shaft 46 through the medium of the gears 44 and 45, and cause the arm 48 to move the rod 51 to the right, which will cause the wheels 14 to assume the dotted line position shown in Fig. 2.

When the wheels of the vehicle are thus turned as in Fig. 2, the vehicle is being steered to negotiate an ordinary turn, but when the vehicle is against an obstruction such as a curb and the operator desires to move the vehicle away from the curb he will move the hand lever 75 forward to disengage the clutch members 56 and 63 and engage the arm 70 and the clutch member 57 as shown in Fig. 7. When the arm 70 is in engagement with the clutch member 57 it prevents the turning of the housing 55 and thus when the steering wheel is turned to the left to turn the front wheels 12 as shown in Fig. 5, rotation will be transmitted to the shaft 39 by the gears 35 and 36 and the shaft will rotate the gear 58. As the housing 55 is held against rotation by the arm 70 the gear 58 will rotate the gears 59 which in turn will cause the gear 60 to rotate the shaft 41 in an opposed direction to the shaft 39, and the shaft 41 will cause the gears 44 and 45 to rotate the shaft 46 to cause the wheels 14 to assume the position as shown in solid lines, Fig. 5.

In Fig. 6 I show the method of applying my device to a vehicle having six wheels wherein the operator is enabled to turn all six wheels for steering purposes. In this construction I employ a reversing transmission 42 between the front wheels 12 and the wheels 14. The construction is the same except that I extend the shaft 41 past the gear 44 and couple the shaft 41 by means of another universal joint 40' to a shaft 39' which corresponds to the shaft 39. The shaft 39' is coupled to a shaft 41'' by means of another reversing transmission 42'. The shaft 41'' operates in the manner as previously described, and causes a rod 80 to turn the rear wheels 15 about a vertical axis 81.

For operating the reversible transmissions 42 and 42' shown in Fig. 6 I provide a hand lever 75ª having a link 72ª pivotally secured to a pivoted arm 72ᵇ. This arm 72ᵇ is pivoted at its center and has rods 72ᶜ and 72ᵈ pivotally secured to its ends. The rod 72ᶜ is pivotally secured to clutch operating arms 65ª and 70ª which are similar to the arms 65 and 70 shown in Fig. 3. The rod 72ª has pivotal engagement with pivoted clutch actuating arms 65ᵇ and 70ᵇ, similar to the arms 65 and 70 shown in Fig. 3. It will be seen from the foregoing description that upon a movement of the hand lever 75ª the clutch mechanisms of the transmissions 42 and 42ª will be actuated simultaneously.

In Fig. 8 I have shown an eight wheeled vehicle with all of the wheels adapted to be shifted for steering purposes. In this view I have shown a vehicle as provided with two pairs of front wheels 12 and 12', adapted to be turned about vertical pivots 19 and 19', and two pairs of rear wheels 14 and 15 adapted to be turned about vertical axes 25' and 81. In this construction I employ a reversing transmission 42ª between the front wheels 12 and 12' and another reversing transmission 42ᵇ between the rear wheels 14 and 15 and control the clutch operating arms 65 and 70 of each transmission through a series of rods from a single hand lever 75.

It will be apparent from the drawings and the foregoing description that with my novel steering arrangement I can steer as many wheels as I desire without departing from the features of my invention. This may be done by installing a reversing transmission between each pair of wheels which it is desired to have turn in the same direction at times, and turn in opposite directions at other times.

By referring to Fig. 8, it will be seen that in ordinary steering the pairs of front wheels 12 and 12' are turned opposed to each other, and the rear pairs of wheels 14 and 15 are turned opposed to each other, and it is therefore necessary to have a reversing transmission 42 between the wheels 12 and 12' and also between the wheels 14 and 15. But as the wheels 12' and 14 turn in the same direction at all times it is not necessary to have a reversing transmission between them.

In Fig. 9 I have shown an eight wheeled vehicle having two pairs of front wheels 100 and 101 and two pairs of rear wheels 102 and 103. The pair of wheels 100 is adapted to be turned about vertical axes 104, and the pair of wheels 102 is adapted to be turned about vertical axes by steering knuckles 105. The front pair of wheels 100 are adapted to be steered by the usual cross rod 106 which may in turn be connected to the usual steering wheel (not shown), and the rear wheels 102 are adapted to be steered by a modified form of reversing transmission 107.

This form of transmission includes a housing 108 having a shaft 109 mounted therein which is adapted to be rotated by a pinion 110 secured thereto at one end. The pinion 110 is arranged to be rotated by a transversely extending toothed rack 111 which is connected by means of a ball joint 112 with the rod 106 and reciprocates in unison therewith.

The shaft 109 is supported intermediate its length in a bearing 113 secured to a transverse member 114 of the vehicle. The end of the rack 111 is supported and kept in engagement with the pinion 110 by a stirrup 115 which is supported on the shaft 109.

Within the housing 108 there are a pair of gears 116 and 117 connected by a hub 118 and slidably mounted on the shaft 109 and adapted to be driven from the shaft 109 by means of a key 119. For reciprocating the hub 118 along the shaft 109 I provide an enlarged portion 120 on the hub with a slot 122 engaging a pin 121 in an arm 123 which is pivoted to the housing at 124. The arm is operated by a rod 125 which is in turn operated by a hand lever 126. Also mounted within the housing 108 and secured to a shaft 126' I show a pair of gears 127 and 128. The gear 127 meshes with an idling gear 129 mounted on a stub shaft 130 which is supported in the housing 108. The shaft 126' is connected to a shaft 131 (see Fig. 9) by means of a universal joint 132 and the shaft 131 is connected to a shaft 133 by another universal joint 132. The shaft 133 has secured thereto a gear 134 in mesh with a gear 135 which is mounted on a shaft 136. The shaft 136 has secured to its lower end an arm 137 similar to the arm 48 shown in Fig. 3. The arm 137 engages a rod 139 by means of a ball and socket joint 140 and the rod 139 engages a rod 141 through the medium of another ball and socket joint 142, and the rod 141 is in turn connected to arms 143 of the knuckles 105 by means of ball and socket joints 144.

For normal steering the gear 116 meshes with the idling gear 129 and the gear 117 is out of mesh with the gear 128 as shown in Fig. 9. When the gears of the transmission are in this relation and the operator turns the steering wheel to cause the wheels 100 to assume the dotted line position shown in Fig. 9, the rack 111 will move to the left and cause the pinion 110 to rotate. The pinion 110 will rotate the shaft 109 and cause the gear 116 to rotate the idling gear 129 which will in turn rotate the gear 127 and cause the shaft 126 to rotate in the same direction as the shaft 109. As the shaft 126 rotates it causes the arm 137, through the medium of gears 134 and 135 and the shaft 136, to move the rod 139 to the left, and as the rod 139 moves to the left it moves the rod 141 to the left also, to cause the wheels 102 to assume the dotted line position shown in Fig. 8.

When the operator desires to turn the wheels 100 and 102 in the same direction for moving the vehicle away from an obstruction, he shifts the hand lever to cause the gear 117 to mesh with the gear 128 and bring the gear 116 out of mesh with the gear 129 as shown in Fig. 9. When the gears are in this relation a rotation of the shaft 109 will rotate the gear 117 in an opposed direction to the shaft 109. When the shaft 126 is thus rotated it will cause the wheels 102 to be turned in the same direction as the wheels 100.

This modified form of transmission may be used in the same manner as the first mentioned form of transmission, that is, it may be used for steering as many wheels as desired by simply placing a reversing transmission between each set of wheels, which at times turn opposed to each other and at other times turn in the same direction.

From the foregoing description it will be apparent that I have provided an improved vehicle steering mechanism which can be economically manufactured and which is highly efficient in use.

What I claim is:

1. In a motor vehicle, a frame, said frame having a pair of front wheels pivotally mounted thereon for steering, a truck pivotally mounted on said frame near the end thereof, said truck having front and rear wheels thereon, the front wheels of said truck being mounted for steering movement independently of said truck, means to steer the front wheels of the vehicle, means to connect the steering mechanism of the front wheels of the vehicle and the front wheels of the truck whereby they may be simultaneously actuated, said connecting means including controllable mechanism whereby the front wheels of the truck may be moved in the same direction as the front wheels of the frame, or in a direction opposite to the front wheels of the frame.

2. In combination with a vehicle having a plurality of wheels, means for turning certain of said wheels in pairs about vertical axes, said means comprising a hand wheel and a hand wheel shaft, a gear mounted on said hand wheel shaft, a horizontally extending shaft, a second gear on said last mentioned shaft and in mesh with said first gear, a housing, said last mentioned shaft having a gear thereon arranged in said housing, a pair of coaxial gears in said housing and engaging said other housing gear, a fourth housing gear engaging each of said pairs of housing gears, a steering rod, an arm for imparting transverse reciprocating movement to said rod, means whereby said fourth housing gear moves said arm, said housing being rotatably mounted, a clutch member on said housing adapted to engage a clutch member mounted on and rotated by said horizontal shaft, an additional clutch member on said housing, means engaging the last mentioned member for holding said housing against rotation, and means for engaging and disengaging said clutch members at will.

In testimony whereof, I hereunto affix my signature.

JAMES E. WRIGHT.